US012186935B1

United States Patent
Cox et al.

(10) Patent No.: US 12,186,935 B1
(45) Date of Patent: Jan. 7, 2025

(54) JOINING ADDITIVELY MANUFACTURED CERAMIC GREEN BODIES

(71) Applicant: Honeywell Federal Manufacturing & Technologies, LLC, Kansas City, MO (US)

(72) Inventors: Brandon Cox, Lee's Summit, MO (US); Joseph Reyes, Gladstone, MO (US); Connor Lane Chadbourne, Kansas City, MO (US); Alexandra Dzubak, Kansas City, MO (US); Thomas Canfield, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/238,209

(22) Filed: Aug. 25, 2023

(51) Int. Cl.
*B28B 11/02* (2006.01)
*B28B 1/00* (2006.01)
(Continued)

(52) U.S. Cl.
CPC .............. *B28B 11/02* (2013.01); *B28B 1/001* (2013.01); *B28B 3/00* (2013.01); *B33Y 10/00* (2014.12); *B33Y 40/20* (2020.01); *B33Y 80/00* (2014.12)

(58) Field of Classification Search
CPC .......... B29C 64/10–141; B29C 64/165; B29C 64/386; B29C 64/393; B22F 10/00;
(Continued)

(56) References Cited

U.S. PATENT DOCUMENTS

| 4,722,824 A | 2/1988 | Wiech, Jr. |
| 7,318,874 B2 | 1/2008 | Roosen et al. |

(Continued)

FOREIGN PATENT DOCUMENTS

| CA | 2848672 C | 4/2017 |
| DE | 102018219191 A1 * | 5/2020 |

(Continued)

OTHER PUBLICATIONS

Eggers, Machine Translation of DE102021211487 generated Jan. 16, 2024 (Year: 2023).*

(Continued)

*Primary Examiner* — Philip C Tucker
*Assistant Examiner* — Andrew L Swanson
(74) *Attorney, Agent, or Firm* — Erise IP, P.A.

(57) ABSTRACT

Methods and systems for additively manufacturing a unitary ceramic part and repairing damaged ceramic parts including additively manufacturing a first ceramic green body having a joint surface and a second ceramic green body having a joint surface, wherein the joint surfaces are configured to be interfaced. The first ceramic green body and the second ceramic green body are sintered to form the unitary part. Additional ceramic green bodies may be connected and sintered to form the unitary part. The ceramic green bodies may have defects or may be damaged. A ceramic sheet may be manufactured and applied to the ceramic green bodies to repair the defects or damage. The ceramic sheet may be sintered with the ceramic green bodies to form the unitary part.

13 Claims, 8 Drawing Sheets

(51) Int. Cl.
*B28B 3/00* (2006.01)
*B33Y 10/00* (2015.01)
*B33Y 40/20* (2020.01)
*B33Y 80/00* (2015.01)

(58) Field of Classification Search
CPC .......... B22F 10/10; B22F 10/12; B22F 10/14; B22F 10/16; B22F 10/18; B22F 10/60; B22F 10/64; B22F 10/66; B22F 10/80; B22F 10/85; B33Y 50/00; B33Y 50/02
See application file for complete search history.

(56) References Cited

U.S. PATENT DOCUMENTS

| | | | |
|---|---|---|---|
| 9,944,021 | B2 | 4/2018 | Easter et al. |
| 10,260,401 | B2 | 4/2019 | Kaida et al. |
| 2009/0029843 | A1 | 1/2009 | Mikijelj |
| 2016/0354839 | A1 | 12/2016 | Schick et al. |
| 2018/0162062 | A1* | 6/2018 | Mark ................ B22F 10/47 |
| 2024/0051019 | A1* | 2/2024 | Natarajan ........... B22F 3/1021 |

FOREIGN PATENT DOCUMENTS

| | | | | |
|---|---|---|---|---|
| DE | 102021211487 A1 | * | 4/2023 | ............ B22F 10/14 |
| GB | 2608193 A | * | 12/2022 | ............ B22F 10/14 |

OTHER PUBLICATIONS

Shad, Machine Translation of DE102018219191 generated Jan. 16, 2024 (Year: 2020).*

Jansson, Scale factor and shrinkage in additive manufacturing using binder jetting, 2016 (accessed Apr. 25, 2024), KTH, https://www.diva-portal.org/smash/get/diva2:950841/FULLTEXT01.pdf (Year: 2016).*

Zhang, Yicha et al. "Feature Based Building Orientation Optimization for Additive Manufacturing." Rapid prototyping journal 22.2 (2016): 358-376. Web. (Year: 2016).*

Overlap definition, Jun. 6, 2023 (Dated by use of Internet Archive, accessed Apr. 29, 2024), Merriam-Webster, Internet Archive screen capture included, https://web.archive.org/web/20230606073156/https://www.merriam-webster.com/dictionary/overlap (Year: 2016).*

* cited by examiner

JOINING ADDITIVELY MANUFACTURED CERAMIC GREEN BODIES

STATEMENT OF GOVERNMENT SUPPORT

This invention was made with Government support under Contract No.: DE-NA-0002839 awarded by the United States Department of Energy/National Nuclear Security Administration. The Government has certain rights in the invention.

BACKGROUND

1. Field

Embodiments of the invention relate to additively manufacturing ceramic parts. More specifically, embodiments of the invention relate to combining additively manufactured ceramic green bodies into a unitary part.

2. Related Art

Generally, ceramic additive manufacturing is limited to the print volume available within the ceramic additive manufacturing device. This requires increasing the size of the print volume to manufacture larger parts. Ceramic additive manufacturing also faces issues in high-error rate during printing. These errors prevent manufacturing ceramic parts without significant losses in manufacturing.

SUMMARY

Embodiments of the invention solve the above-mentioned problems by providing systems and methods for combining additively manufactured ceramic parts into unitary parts and repairing additively manufactured parts with ceramic sheets to prevent loss of additively manufactured ceramic parts.

A first embodiment of the invention is directed to a system for combining additively manufactured ceramic parts comprising a first ceramic part comprising a first joint surface and a first support structure having a first support joint surface, a second ceramic part comprising a second joint surface and a second support structure having a second support joint surface. Wherein the first ceramic part and the second ceramic part are joined by the first and second joint surfaces to form a unitary ceramic part.

A second embodiment of the invention is directed to a method for combining additively manufactured ceramic parts comprising interfacing a first and second ceramic part via joining features present on both the first and second ceramic part, then sintering them to form a unitary part.

A third embodiment of the invention is directed to a method for combining a plurality of additively manufactured ceramic parts wherein at least two of ceramic parts comprise a single joint surface and at least one of the ceramic parts comprises two joint surfaces. The ceramic parts are connected then sintered to form a unitary ceramic part.

A fourth embodiment of the invention is directed to a method for repairing a damaged additively manufactured ceramic part by applying an additively manufactured ceramic sheet then sintering the damaged part and the ceramic sheet to form a unitary ceramic part.

In some embodiments, the invention is directed to a method for producing a unitary part, the method including: additively manufacturing a first ceramic part including a first joint surface and a first support structure; additively manufacturing a second ceramic part including a second joint surface and a second support structure; positioning the first ceramic part and the second ceramic part such that the first joint surface contacts the second joint surface and the first support structure contacts the second support structure; sintering the first joint surface to the second joint surface and the first support structure to the second support structure to form the unitary part including the first ceramic part and the second ceramic part; and separating the first support structure and the second support structure from the unitary part.

In some embodiments, the invention is directed to a method, wherein the first joint surface and the second joint surface are configured to be pressure fit during sintering.

In some embodiments, the invention is directed to a method, further including manufacturing a third support structure configured to support the first ceramic part and a fourth support structure configured to support the second ceramic part.

In some embodiments, the invention is directed to a method, wherein the first support structure and the second support structure include a ceramic material.

In some embodiments, the invention is directed to a method, wherein the third support structure and the fourth support structure include a dissolvable material.

In some embodiments, the invention is directed to a method, further including dissolving the third support structure and second support structure.

In some embodiments, the invention is directed to a method, wherein the first support structure and the second support structure each include separable features configured to separate from the first ceramic part and the second ceramic part without damaging the first ceramic part and the second ceramic part.

In some embodiments, the invention is directed to a method of additively manufacturing a unitary ceramic part, the method including: additively manufacturing a first ceramic green body using a first print direction, the first ceramic green body including a first joint surface; additively manufacturing a second ceramic green body using a second print direction that is distinct from the first print direction, the second ceramic green body including a second joint surface; connecting the first ceramic green body and the second ceramic green body by joining the first joint surface to the second joint surface; and sintering the first ceramic green body and the second ceramic green body to form the unitary ceramic part, wherein the first print direction causes the first ceramic green body to shrink along a first dimension during sintering, and wherein the second print direction causes the second ceramic green body to shrink along a second dimension during sintering.

In some embodiments, the invention is directed to a method, wherein the first joint surface and the second joint surface each include interfacing features configured to provide a rigid connection between the first ceramic green body and the second ceramic green body.

In some embodiments, the invention is directed to a method, wherein the first print direction causes the first ceramic green body to shrink in a first direction during sintering, and wherein the second print direction causes the second ceramic green body to shrink in a second direction during sintering.

In some embodiments, the invention is directed to a method, wherein the second joint surface shrinks around the first joint surface during sintering.

In some embodiments, the invention is directed to a method, wherein the first ceramic green body and the second ceramic green body include a resin-ceramic slurry and wherein the resin-ceramic slurry is cured prior to sintering the first ceramic green body and the second ceramic green body.

In some embodiments, the invention is directed to a method, further including applying a layer of uncured mixture of resin and ceramic powder to the first joint surface and the second joint surface before sintering.

In some embodiments, the invention is directed to a method, wherein sintering the first ceramic green body and the second ceramic green body into a unitary part increases a density of the first ceramic green body and the second ceramic green body such that the unitary part has a density higher than that of the first ceramic green body and the second ceramic green body.

In some embodiments, the invention is directed to a method of manufacturing a unitary ceramic part including: manufacturing a first ceramic part having at least one first joint surface; manufacturing a second ceramic part having at least one second joint surface; connecting the first ceramic part and the second ceramic part and by the at least one first joint surface and the at least one second joint surface; and sintering the first ceramic part and the second ceramic part to form a unitary part.

In some embodiments, the invention is directed to a method, wherein the first ceramic part includes a first support structure and the second ceramic part includes a second support structure.

In some embodiments, the invention is directed to a method, wherein the first support structure includes a first support joint surface and the second support structure includes a second support joint surface.

In some embodiments, the invention is directed to a method, wherein the first support structure and the second support structure are configured to prevent flexion of the first ceramic part and second ceramic part during sintering.

In some embodiments, the invention is directed to a method, wherein the first ceramic part is configured to shrink in a first direction and the second ceramic part is configured to shrink a second direction distinct from the first direction.

In some embodiments, the invention is directed to a method, further including applying a layer of resin-ceramic slurry to the at least one first joint surface and the at least one second joint surface.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
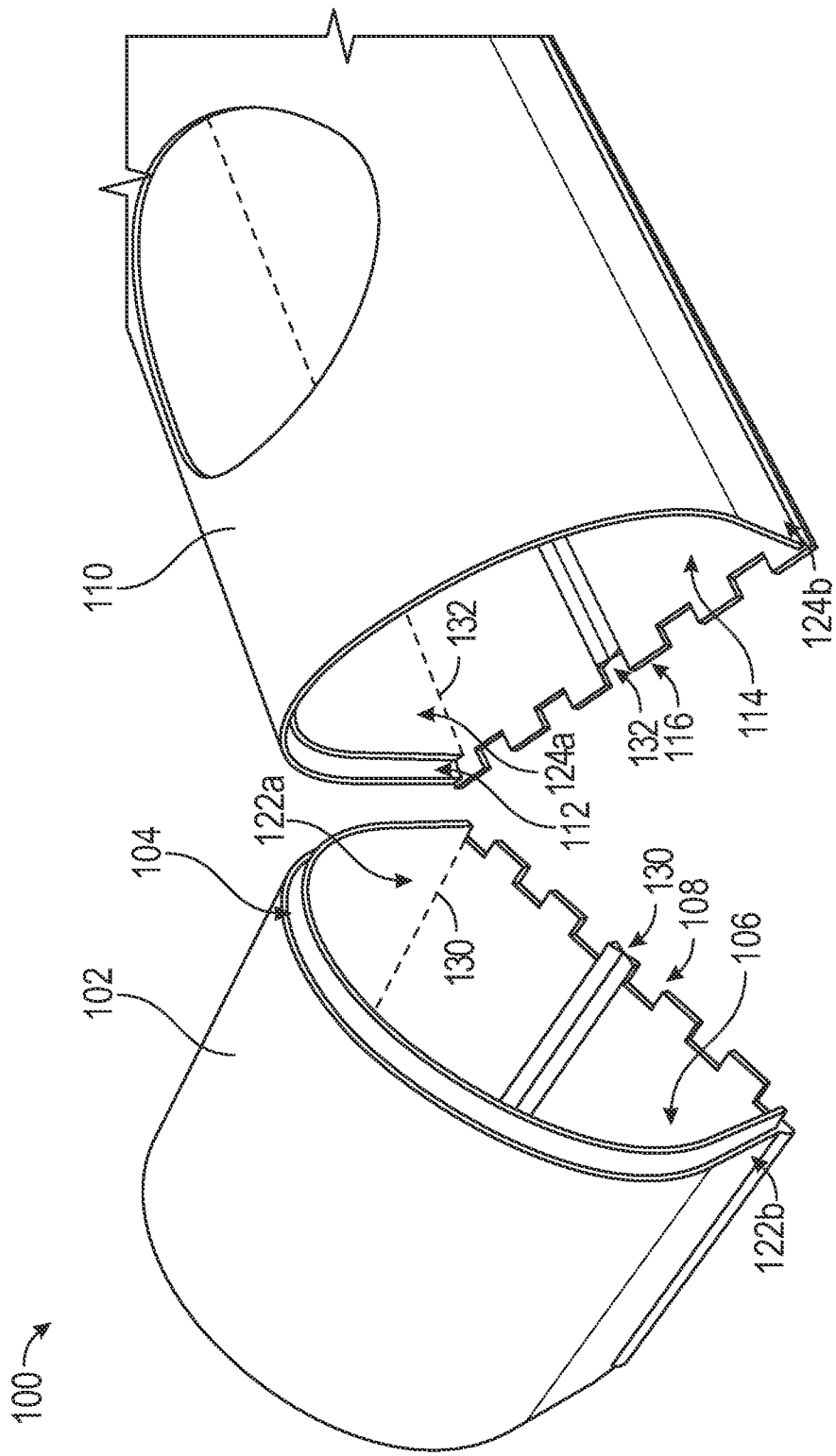
FIG. 1 illustrates a system for combining a first ceramic green body and a second ceramic green body for some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Example of the System

FIG. 1 illustrates an example of a system for joining a first additively manufactured ceramic green body to a second additively manufactured ceramic green body for some embodiments. In some embodiments, system 100 comprises first ceramic green body 102. In some embodiments, first ceramic green body 102 is additively manufactured. For example, first ceramic green body 102 may be manufactured using 3D-printers such as: selective laser sintering printers, fused deposition modeling printers, digital light process printers, stereolithography printers, multi-jet fusion printers, polyjet printers, direct metal laser sintering printers, electron beam emitting printers, or any other 3D printer method. In some embodiments, first ceramic green body 102 may be manufactured from a resin-ceramic slurry.

In some embodiments, the resin-ceramic slurry may comprise a mixture of resin and ceramic powder that is sintered to solidify the ceramic powder and remove the resin thereby shrinking the total volume of the resin-ceramic slurry. In some embodiments, the ratio of resin to ceramic determines the amount the resin-ceramic slurry shrinks during sintering. For example, a ratio of 1:1 (i.e., 50% resin and 50% ceramic powder) may shrink 50% during sintering. Additionally, for example, a ratio of 1:2 (i.e., 33.3% resin and 66.7% ceramic powder) may shrink 33.3% when sintered. In some embodiments, the resin-ceramic slurry may comprise materials other than resin and ceramic powder. For example, the resin-ceramic slurry may comprise a plastic and ceramic chunk slurry. In some embodiments, sintering the resin-ceramic slurry may increase the density of resulting part by removing the resin material from the part leaving only the ceramic powder.

In some embodiments, first ceramic green body 102 may comprise first joint surface 104. In some embodiments, first joint surface 104 may comprise a joint configured to connect to a second joint surface. For example, first joint surface 104 may comprise an angled cut matching a second angled cut in second joint surface 112. In some embodiments, first joint surface 104 is interfaced with second joint surface 112 such that first ceramic green body 102 and second ceramic green body 110 combine forming unitary part 202 (depicted in FIG. 2). In some embodiments, first joint surface 104 may be manufactured from the same resin-ceramic slurry used to manufacture first ceramic green body 102. In some embodiments, first joint surface 104 may comprise interfacing features such as dovetail joints, interlocking teeth, or any other such interfacing feature that provides a rigid connection. Further examples of interfacing features can be found described with second joint surface 112 below.

In some embodiments, first ceramic green body 102 may comprise first support structure 106. In some embodiments, first support structure 106 may extend from first ceramic green body 102. In some embodiments, first support structure 106 is separated from first ceramic green body 102 by applying a force along a predetermined area/surface of first support structure 106. In some embodiments, the predetermined area/surface is a separable feature. In some embodiments, first ceramic green body 102 comprises first separable features 130. In some embodiments, first support structure 106 is configured to break away from first ceramic green body 102 via first separable features 130. In some embodiments, first separable features 130 may comprise a low percentage contact surface configured to provide contact between first support structure 106 and first ceramic green body 102. For example, first separable features 130 may only contact 5-10%, 5-15%, 5-20%, or 5-25% of first ceramic green body 102 such that first support structure 106 may be separable from first ceramic green body 102. First separable features 130 may comprise pyramidal features having a low percentage of contact between first support structure 106 and first ceramic green body 102. In some embodiments, first separable features 130 may have a high area of contact on first support structure 106 and a low area of contact on first ceramic green body 102.

In some embodiments, first support structure 106 may comprise first support joint surface 108. In some embodiments, first support joint surface 108 may comprise joining features configured to interface with a second support joint surface having similar joining features (second ceramic green body 110 and second support structure 114 as described below). In some embodiments, first support joint surface 108 may comprise a ceramic material. In some embodiments, first support joint surface 108 is configured to shrink during a sintering process. In some embodiments, first support joint surface 108 may shrink in a first shrinking direction based upon the print direction of first support structure 106.

In some embodiments, first support joint surface 108 may be configured to interface with a second support joint surface integrated into second joint surface 112 of a second ceramic green body. For example, first support joint surface 108 may comprise a sawtooth pattern matching a sawtooth pattern in a second support joint surface. First support joint surface 108 and the second support joint structure may be interfaced and then sintered to combine first support joint surface 108 and the second support joint surface to form a unitary support structure.

In some embodiments, first ceramic green body 102, first joint surface 104, first support structure 106, and first support joint surface 108 may be comprised of a resin-ceramic slurry that is sintered to solidify the resin-ceramic slurry. In some embodiments, the resin-ceramic slurry may be configured to shrink during sintering. For example, first ceramic green body 102 may be manufactured using a resin-ceramic slurry comprising 50% ceramic powder and 50% resin. During sintering, the resin may be melted or burned away resulting in a 50% reduction in size of first ceramic green body 102 post sintering. In some embodiments, the resin-ceramic slurry may comprise any ratio of ceramic to resin.

In some embodiments, system 100 comprises second ceramic green body 110. In some embodiments, second ceramic green body 110 may be substantially similar to first ceramic green body 102. In some embodiments, second ceramic green body 110 may be substantially different from first ceramic green body 102 while still sharing some features. In some embodiments, second ceramic green body 110 may have a print direction distinct from the print direction of first ceramic green body 102. In some embodiments, second ceramic green body 110 may comprise a second joint surface.

In some embodiments, second ceramic green body 110 comprises second joint surface 112 that is configured to interface with first joint surface 104. In some embodiments, second joint surface 112 comprises an angled cut substantially similar to the angled cut present in first joint surface 104. In some embodiments, second joint surface 112 may be any type of joining element. For example, second joint surface 112 may comprise interfacing features such as interlocking tabs, dovetail joints, mortise and tenon joints, butt joints, lap joints, miter joints, scarf joints, dowel joints, rabbet joints, or any other such joining surface. In some embodiments, second joint surface 112 is configured to join with first joint surface 104 while being supported by second joint surface 112.

In some embodiments, second ceramic green body 110 comprises second support structure 114. In some embodiments, second support structure 114 is configured to provide support to second ceramic green body 110 during sintering. In some embodiments, second support structure 114 is configured to resist flexion of second ceramic green body 110 during sintering. In some embodiments, second support structure 114 may be oriented horizontally such that second support structure 114 prevents horizontally inward flexion during sintering. In some embodiments, second support structure 114 may extend between a first edge 122a and second edge 122b of second ceramic green body 110 thereby counteracting horizontal flexion between the first edge 122a and the second edge 122b and preventing damage to second ceramic green body 110. In some embodiments, second support structure 114 may extend between at least two edges of second ceramic green body 110. In some embodiments, second support structure 114 is configured to interface with first support structure 106.

In some embodiments, second support structure 114 may comprise second support joint surface 116. In some embodiments, second support structure 114 is configured to interface with first support structure 106 by interfacing second support joint surface 116 and first support joint surface 108. In some embodiments, second support joint surface 116 is interfaced with one or more support joint surfaces substantially similar to first support joint surface 108. For example, second support joint surface 116 and first support joint surface 108 may comprise matching square protrusions. In some embodiments, second support structure 114 and second support joint surface 116 may be configured to separate from second ceramic green body 110 post sintering. In some embodiments, second support joint surface 116 is separated from second ceramic green body 110 by applying a force along a predetermined surface. In some embodiments, the predetermined surface is a separable feature such as first separable features 130.

In some embodiments, second support structure 114 may comprise second separable features 132 substantially similar to first separable features 130 such that second support structure 114 may be separated from second ceramic green body 110 after sintering is completed. In some embodiments, second separable features 132 comprise pyramidal features configured to connect second support structure 114 and second ceramic green body 110. In some embodiments, second separable features 132 may be configured to contact only a small surface of second ceramic green body 110. For example, first separable features 130 may be configured to contact 5-10%, 5-15%, 5-20%, or 5-25% of second ceramic green body 110. It is contemplated that second separable features 132 may be configured to contact any percentage of second ceramic green body 110 such that second support structure 114 may be separated from second ceramic green body 110 after sintering without departing from the scope of the present disclosure.

In some embodiments, first ceramic green body 102 may comprise additive manufacturing supports for providing structural support during additive manufacturing. For example, first ceramic green body 102 may require additively manufacturing an arch, bridge, or other floating structure. To support the floating structure, additive manufacturing supports may be constructed underneath the floating structure. In some embodiments, the additive manufacturing supports may comprise the same resin-ceramic slurry as first ceramic green body 102. In some embodiments, the additive manufacturing supports may comprise a dissolvable material that can be submerged in water to decompose the additive manufacturing supports. In some embodiments, the additive manufacturing supports may comprise polyvinyl alcohol, polylactic acid, wax, sodium silicate, potassium silicate, ceramic powders or any other such material.

In some embodiments, first ceramic green body 102 and second ceramic green body 110 may comprise separate materials such that first ceramic green body 102 shrinks according to a first dimension and second ceramic green body 110 shrinks according to a second dimension. In some embodiments, first ceramic green body 102 and second ceramic green body 110 may be additively manufactured using a first print direction and a second print direction respectively. The first print direction and the second print direction may be entirely parallel and/or the same direction. The first print direction may be perpendicular to the second print direction. In some embodiments, the first print direction may be oriented at an angle according to the second print direction. In some embodiments, the first and second print direction may be non-parallel at an arbitrary angle. In some embodiments, the first print direction and the second print direction may determine the direction first ceramic green body 102 and second ceramic green body 110 shrink respectively. In some embodiments, first ceramic green body 102 may shrink according to a first dimension and second ceramic green body 110 may shrink according to a second dimension. For example, first ceramic green body 102 may have a print direction wherein each layer includes a longitudinal cross-section of first ceramic green body 102 and second ceramic green body 110 may have a print direction wherein each layer includes a lateral cross-section of second ceramic green body 110. Thus, when the parts are sintered, first ceramic green body 102 may shrink according to a longitudinal dimension and second ceramic green body 110 may shrink according to a lateral dimension. It is contemplated that the difference in print directions may be associated with shrinking according to any dimension without departing from the scope of the present disclosure.

In some embodiments, the ratio of resin to ceramic in the resin-ceramic slurry of first ceramic green body 102 and second ceramic green body 110 may cause first joint surface 104 and second joint surface 112 to be pressure fit together. For example, first ceramic green body 102 may comprise a resin-ceramic slurry with a ratio of 1:1 (i.e., 50% resin, 50% ceramic) whereas second ceramic green body 110 may comprise a resin-ceramic slurry with a ratio of 49:51 (i.e., 49% resin, 51% ceramic powder). However, in some embodiments, other ratios of resin to ceramic not explicitly described herein are also contemplated. The difference in ratios may result in first ceramic green body 102 shrinking less than second ceramic green body 110. If first joint surface 104 overlaps second joint surface 112 then the joint between first ceramic green body 102 and second ceramic green body 110 may be pressure fit due to the difference in resin to ceramic ratios.

Figure 2:
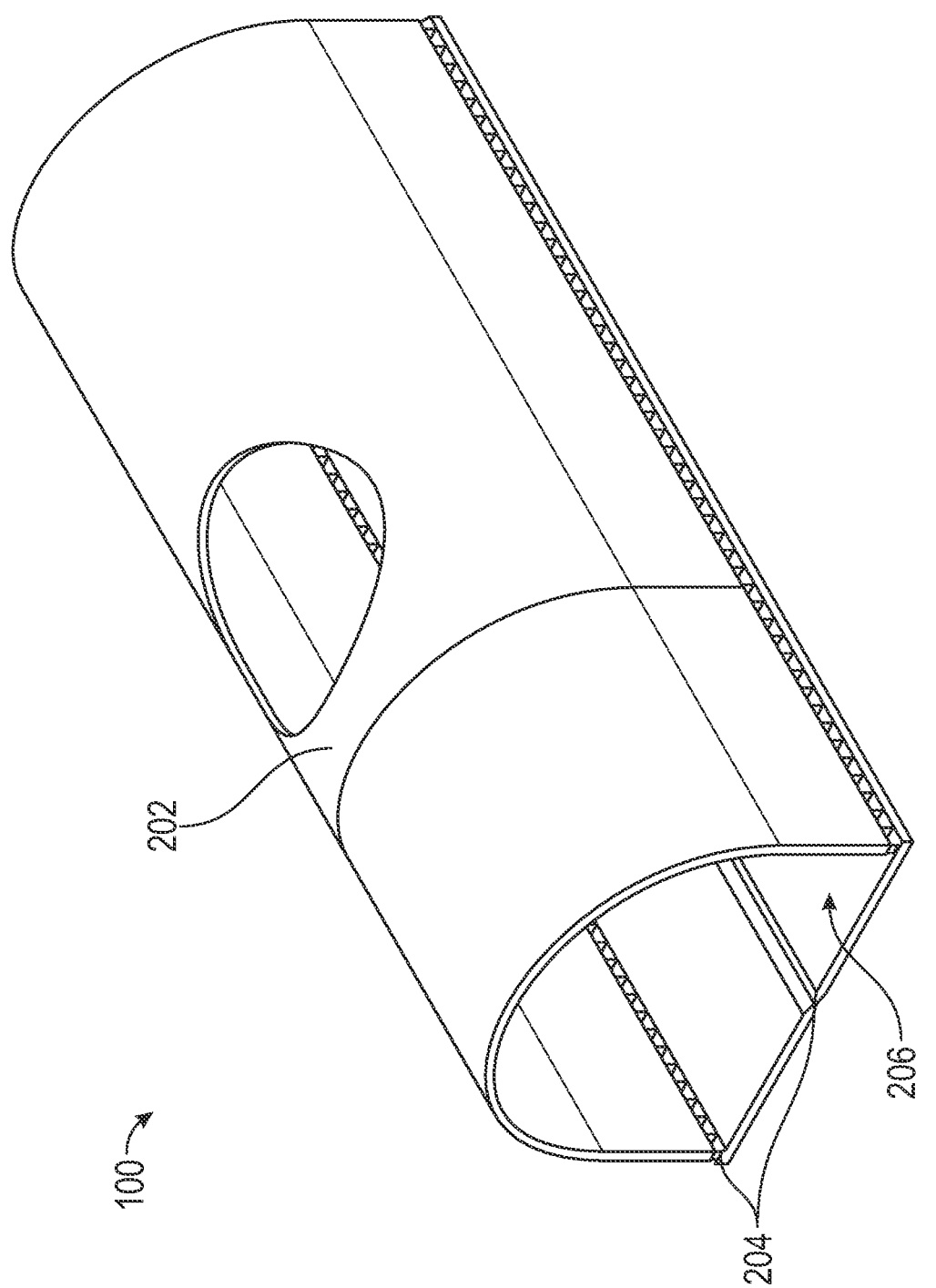
FIG. 2 illustrates a first ceramic green body and a second ceramic green body combined to form a unitary ceramic part for some embodiments.
Figure 3:
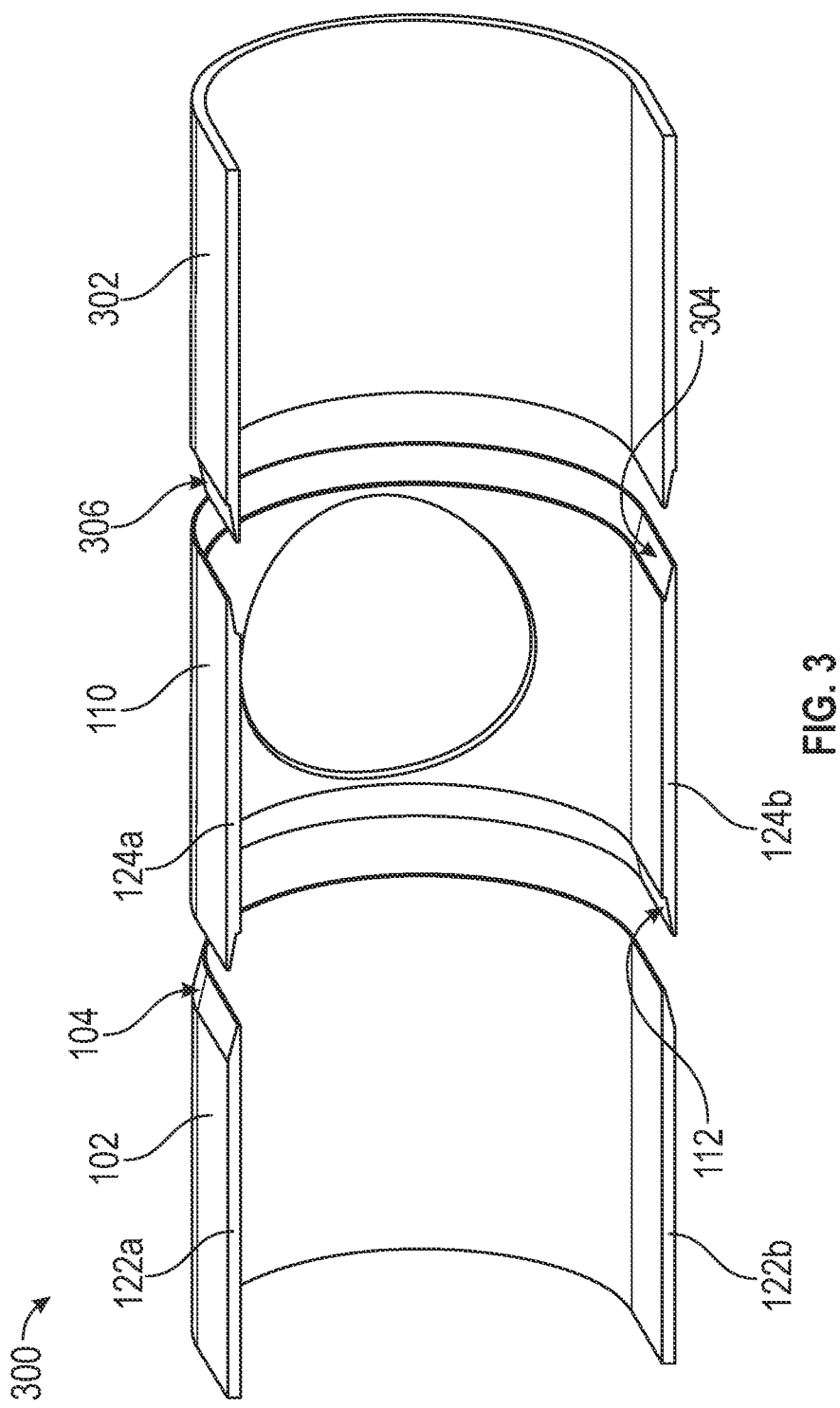
FIG. 3 illustrates a system for combining a plurality of ceramic green bodies to form a unitary ceramic part for some embodiments.

FIG. 2 illustrates a first ceramic part and a second ceramic part combined to form a unitary ceramic part for some embodiments. In some embodiments, system 100 may combine first ceramic green body 102 and third ceramic green body 302 (as shown in FIG. 3) forming unitary part 202. In some embodiments, unitary part 202 may include any or all of the features of system 100. For example, unitary part 202 may comprise first support structure 106 and second support structure 114 combined to form a unitary support structure. In some embodiments, unitary part 202 is sintered to solidify the joints between each element of system 100. In some embodiments, system 100 may comprise a single unitary part for some embodiments.

In some embodiments, unitary part 202 may comprise unitary breakaway-features 204. In some embodiments, unitary breakaway-features 204 may comprise first separable features 130 and second separable features 132 of first ceramic green body 102 and second ceramic green body 110 respectively. In some embodiments, unitary breakaway-features 204 are configured to separate from unitary part 202 such that no part of unitary support structure 206 may remain attached to unitary part 202. In some embodiments, separating unitary breakaway-features 204 is achieved by applying a force to unitary support structure 206. In some embodiments, a force may be applied directly to unitary breakaway-features 204 causing unitary support structure 206 to separate from unitary part 202 by unitary breakaway-features 204. In some embodiments, unitary support structure 206 and unitary part 202 may comprise different materials. For example, unitary part 202 may comprise resin-ceramic slurry and unitary support structure 206 may comprise only resin. In some embodiments, unitary part 202 may comprise a ceramic-metal composite and/or unitary support structure 206 may comprise a resin-ceramic slurry.

In some embodiments, unitary part 202 may be formed by combining two or more ceramic green bodies such as first ceramic green body 102 and second ceramic green body 110. In some embodiments, unitary part 202 may be formed by sintering first ceramic green body 102 and second ceramic green body 110 together. In some embodiments, first ceramic green body 102 and second ceramic green body 110 may be sintered with a plurality of other ceramic green bodies to form unitary part 202.

FIG. 3 illustrates a system for combining a plurality of ceramic green bodies into a unitary part for some embodiments. In some embodiments, the system for combining a plurality of ceramic green bodies is exemplified by system 300. In some embodiments, system 300 comprises first ceramic green body 102, second ceramic green body 110 and third ceramic green body 302. In some embodiments, third ceramic green body 302 comprises fourth joint surface 306. In some embodiments, system 300 may be configured to join first ceramic green body 102 to second ceramic green body 110 and second ceramic green body 110 to third ceramic green body 302.

In some embodiments, system 300 may comprise any amount of additional ceramic green bodies. In some embodiments, any or all of the ceramic green bodies may be configured to join to any other amount of ceramic green bodies. In some embodiments, the additional ceramic green bodies may be sintered with first ceramic green body 102, second ceramic green body 110, and third ceramic green body 302 to form a unitary ceramic part.

In some embodiments, first ceramic green body 102 is joined to second ceramic green body 110 and second ceramic green body 110 is joined to third ceramic green body 302. In some embodiments, system 300 comprises a plurality of additional ceramic green bodies that may interface between first ceramic green body 102 and third ceramic green body 302. In some embodiments, each of the ceramic green bodies may be joined to form unitary part 202. In some embodiments, first ceramic green body 102, second ceramic green body 110, third ceramic green body 302, and/or any other ceramic green bodies may be joined to form one or more unitary parts (such as unitary part 202 as described above).

In some embodiments, system 300 comprises second ceramic green body 110. In some embodiments, second ceramic green body 110 comprises third joint surface 304. In some embodiments, third joint surface 304 is configured to interface with another joint surface. For example, third joint surface 304 may be configured to interface with fourth joint surface 306. In some embodiments, third joint surface 304 may be substantially similar to first joint surface 104. For example, third joint surface 304 may comprise an angled surface configured to interface with another angle surface. In some embodiments, third joint surface 304 comprises a saw tooth edge matching a saw tooth edge of fourth joint surface 306.

Figure 4:
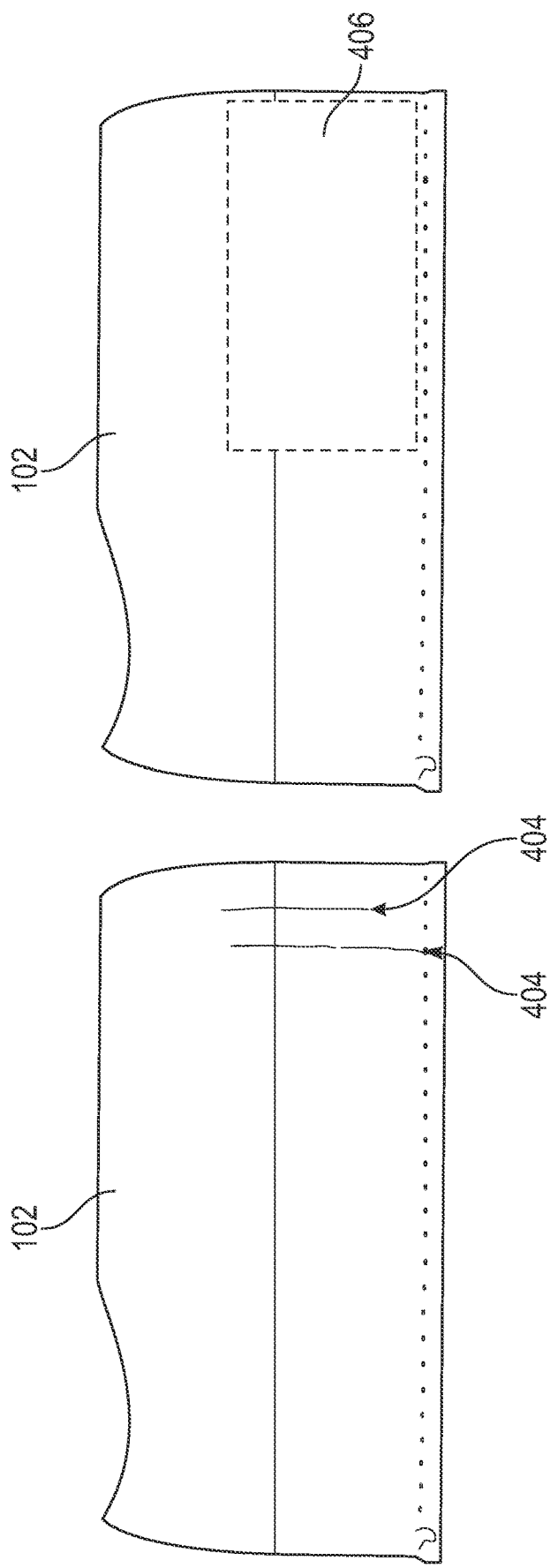
FIG. 4 illustrates a system for repairing a damaged ceramic part with ceramic sheets for some embodiments.

FIG. 4 illustrates a ceramic sheet applied to a damaged ceramic part for some embodiments. In some embodiments, first ceramic green body 102 may comprise manufacturing defects 404. In some embodiments, manufacturing defects 404 may be a skipped layer, a layer separation, a misprinted section, and/or any other additive manufacturing error. In some embodiments, manufacturing defects 404 may be present only on first ceramic green body 102. In some embodiments, manufacturing defects 404 may be present on any portion of first ceramic green body 102, second ceramic green body 110, and/or any other additively manufactured green bodies. In some embodiments, manufacturing defects 404 are repaired using a ceramic sheet.

In some embodiments, ceramic sheet 406 may be applied to first ceramic green body 102 to repair manufacturing defects 404. For example, manufacturing defects 404 may be one or more skipped layers of first ceramic green body 102. Ceramic sheet 406 may cover manufacturing defects 404 and replace the missing material by forming with the surface of first ceramic green body 102 as depicted in FIG. 4. In some embodiments, ceramic sheet 406 may be applied to both first ceramic green body 102 and second ceramic green body 110 to repair manufacturing defects 404 present in any or all of the ceramic green bodies.

In some embodiments, manufacturing defects 404 are present on first support structure 106 and/or second support structure 114. In some embodiments, manufacturing defects 404 present on first support structure 106 may be repaired using at least one ceramic sheet 406. In some embodiments, ceramic sheet 406 may repair premature separation of first support structure 106 and first ceramic green body 102. In some embodiments, ceramic sheet 406 may repair premature separation of second support structure 114 and second ceramic green body 110. In some embodiments, first ceramic green body 102 and second ceramic green body 110 each comprise manufacturing defects 404 that prevent first ceramic green body 102 and second ceramic green body 110 from joining. In some embodiments, ceramic sheet 406 may be applied to connect first ceramic green body 102 and second ceramic green body 110. For example, first joint surface 104 may comprise a flat surface and second joint surface 112 may comprise a flat surface. In some embodiments, first joint surface 104 and second joint surface 112 may be uneven which may cause first joint surface 104 and second joint surface 112 to separate during sintering. Ceramic sheet 406 may be applied across first joint surface 104 and second joint surface 112 preventing separation of first ceramic green body 102 and second ceramic green body 110 during sintering.

In some embodiments, ceramic sheet 406 is used to combine first ceramic green body 102 and second ceramic green body 110. For example, first ceramic green body 102 and second ceramic green body 110 may be positioned such that first joint surface 104 and second joint surface 112 interface and a plurality of ceramic sheet 406 may be applied between first ceramic green body 102 and second ceramic green body 110. Thereby connecting first ceramic green body 102 to second ceramic green body 110. First ceramic green body 102 and second ceramic green body 110 may then be sintered combining them into unitary part 202.

In some embodiments, first ceramic green body 102 and second ceramic green body 110 may be sintered with at least one ceramic sheet 406 connecting first ceramic green body 102 and second ceramic green body 110. In some embodiments, ceramic sheet 406 may replace first joint surface 104 and second joint surface 112 in function. For example, first ceramic green body 102 and second ceramic green body 110 may not comprise first joint surface 104 and second joint surface 112 and ceramic sheet 406 may be used to connect them instead of the joint surfaces. In some embodiments, a single large ceramic sheet 406 may be used to combine first ceramic green body 102 and second ceramic green body 110. In some embodiments, ceramic sheet 406 may be a plurality of smaller ceramic sheets which may be used to combine first ceramic green body 102 and second ceramic green body 110.

In some embodiments, a plurality of ceramic sheets substantially similar to ceramic sheet 406 may be manufactured. In some embodiments, the plurality of ceramic sheets are layered on top of each other to form a ceramic part. For example, a first ceramic sheet may be a base layer. Then a second ceramic sheet may be applied to the first ceramic sheet to form a thicker ceramic part. Further, a third ceramic sheet may be applied to the first and second ceramic sheet to further thicken the ceramic part. This process may continue to increase the thickness of the ceramic part. In some embodiments, the plurality of ceramic sheets may be shaped to form different features of the ceramic part. For example, the first ceramic sheet may form the base of some features and the second ceramic sheet may form additional features of the ceramic part which may be further enhanced by the third ceramic sheet and so on until the ceramic part is formed in full detail.

Methods of Forming a Unitary Part

Figure 5:
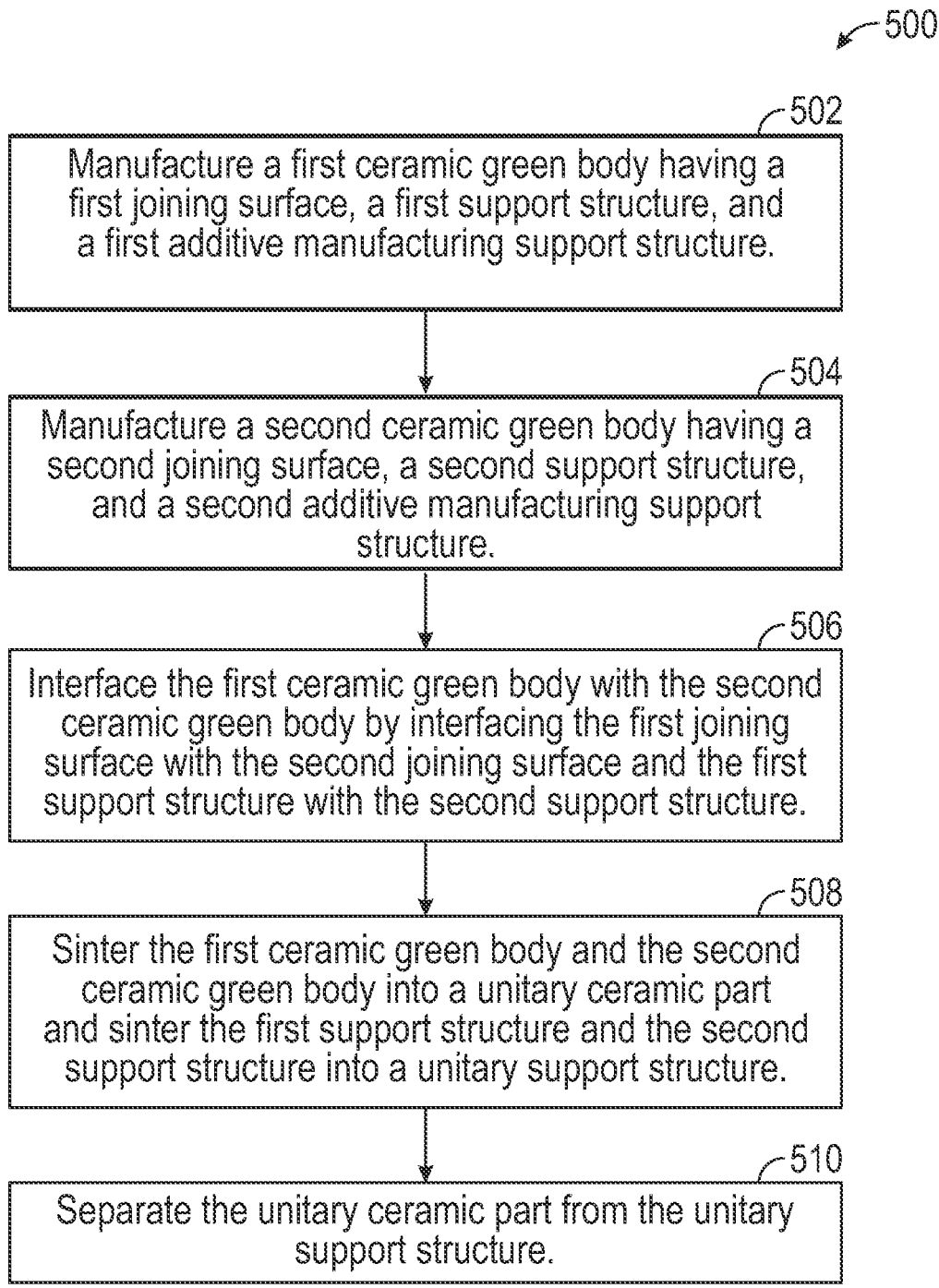
FIG. 5 illustrates a method for combining ceramic green bodies and ceramic support structures to form a unitary ceramic part for some embodiments.

FIG. 5 illustrates a method for producing additively manufactured unitary parts for some embodiments. In some embodiments, the method may be performed by industrial machinery. In some embodiments, the method may be performed by industrial robotic arms. In some embodiments, the method is performed by additive manufacturing machines as described above.

Although first ceramic green body 102 and second ceramic green body 110 are described with their respective features, it is contemplated that first ceramic green body 102 and second ceramic green body 110 may comprise any form of ceramic green body that may be sintered to another ceramic green body by way of the methods described below.

In some embodiments, method 500 begins with step 502. In some embodiments, step 502 may comprise additively manufacturing first ceramic green body 102. In some embodiments, first ceramic green body 102 may comprise a ceramic material configured to shrink when heat is applied to first ceramic green body 102. In some embodiments, first ceramic green body 102 is additively manufactured with first joint surface 104. In some embodiments, first joint surface 104 is configured to interface with second joint surface 112. In some embodiments, first joint surface 104 may be configured to provide frictional contact between first ceramic green body 102 and second ceramic green body 110. In some embodiments, first joint surface 104 and second joint surface 112 may be configured to provide a frictional connection between first ceramic green body 102 and second ceramic green body 110 that remains stable during sintering. For example, first joint surface 104 may be scored to provide a frictional surface compared to a smooth surface. Similarly, second joint surface 112 may be scored to enhance the frictional surface of first joint surface 104. It is contemplated that a wide variety of configurations may be employed to achieve a frictional connection between first ceramic green body 102 and second ceramic green body 110.

In some embodiments, step 502 comprises additively manufacturing first ceramic green body 102 comprising first support structure 106. In some embodiments, first support structure 106 may be manufactured at the same time as first ceramic green body 102. In some embodiments, first support structure 106 may be manufactured following first ceramic green body 102 then attached to first ceramic green body 102. In some embodiments, first support structure 106 may be manufactured as an element of first ceramic green body 102. For example, first ceramic green body 102 may be additively manufactured and integrated into the structure of first ceramic green body 102 as described above and depicted in FIG. 1.

In some embodiments, first ceramic green body 102 may be additively manufactured with additive manufacturing supports. For example, first ceramic green body 102 may comprise a floating surface that is typically impossible to additively manufacture without constructing some sort of support structure below the floating surface. Support structures may be additively manufactured along with first ceramic green body 102 to provide structural support to floating structures and/or to the general structure of first ceramic green body 102 itself. In some embodiments, the additive manufacturing supports may comprise the same material as first ceramic green body 102. In some embodiments, the additive manufacturing supports may comprise a dissolvable or removable material as described above.

In some embodiments, method 500 comprises step 504. In some embodiments, step 504 comprises additively manufacturing second ceramic green body 110. In some embodiments, second ceramic green body 110 may comprises second joint surface 112. In some embodiments, second joint surface 112 may be configured to interface with first joint surface 104. In some embodiments, second joint surface 112 may be configured to overlap first joint surface 104. In some embodiments, first joint surface 104 may be configured to overlap second joint surface 112. In some embodiments, first joint surface 104 and second joint surface 112 may form a butt joint, lap joint, miter joint, scarf joint, mortise and tenon joint, dovetail joint, tongue and groove joint, tapered dovetail joint, or any other such joint. In some embodiments, first joint surface 104 may be joined to a third joint surface distinct from second joint surface 112.

In some embodiments, step 504 comprises additively manufacturing second ceramic green body 110 comprising second joint surface 112. In some embodiments, second joint surface 112 is manufactured at the same time as second ceramic green body 110. In some embodiments, second joint surface 112 may be manufactured following second ceramic green body 110. In some embodiments, second joint surface 112 may be manufactured as an element of second ceramic green body 110. For example, second ceramic green body 110 may be additively manufactured and integrated into the structure of second ceramic green body 110 as described above and depicted in FIG. 1. In some embodiments, the elements of first ceramic green body 102 and second ceramic green body 110 may be additively manufactured separately then connected before sintering.

In some embodiments, second ceramic green body 110 may be additively manufactured with additive manufacturing supports. For example, second ceramic green body 110 may comprise a floating surface that is typically impossible to additively manufacture without constructing some sort of support structure below the floating surface. Support structures may be additively manufactured along with second ceramic green body 110 to provide structural support to floating structures and/or to the general structure of second ceramic green body 110 itself. In some embodiments, the additive manufacturing supports may comprise the same material as second ceramic green body 110. In some embodiments, the additive manufacturing supports may comprise a dissolvable or removable material as described above.

In some embodiments the method 500 comprises step 506. In some embodiments, step 506 comprises joining first ceramic green body 102 and second ceramic green body 110 using the first and second joint surface. In some embodiments, first ceramic green body 102 and second ceramic green body 110 are joined by automated machinery. In some embodiments, first ceramic green body 102 and second ceramic green body 110 are configured to be joined by robotic assembly lines. In some embodiments, first ceramic green body 102 and second ceramic green body 110 are joined during the sintering process. In some embodiments, first ceramic green body 102 and second ceramic green body 110 are joined prior to the sintering process. In some embodiments, first ceramic green body 102 and second ceramic green body 110 is positioned such that the first and second joint surface interface with each other. In some embodiments first ceramic green body 102 and second ceramic green body 110 may be interfaced by hand. In some embodiments, first ceramic green body 102 and second ceramic green body 110 may be interfaced partially by machine and partially by hand.

In some embodiments, method 500 may comprise step 508. In some embodiments, step 508 may comprise combining first ceramic green body 102 and second ceramic green body 110 to form unitary part 202 using sintering. In some embodiments, first ceramic green body 102 and second ceramic green body 110 may be sintered in a kiln. In some embodiments, sintering causes first ceramic green body 102 and second ceramic green body 110 to shrink. In some embodiments, the shrinking caused by sintering first ceramic green body 102 and second ceramic part may provide structural support to unitary part 202 formed by first ceramic green body 102 and the second part. In some embodiments, unitary part 202 may be sintered using selective laser sintering. In some embodiments, first ceramic green body 102 and second ceramic green body 110 may be partially sintered using selective laser sintering prior to sintering the rest of first ceramic green body 102 and second ceramic green body 110.

In some embodiments, step 508 may comprise increasing the density of first ceramic green body 102 and second ceramic green body 110 such that unitary part 202 may have a higher density than first ceramic green body 102 and second ceramic green body 110. In some embodiments, the increase in density is caused by the removal of resin during sintering. In some embodiments, the increase in density may be a result of thermodynamic expansion in the ceramic powder of the resin-ceramic slurry.

In some embodiments, method 500 comprises step 510. In some embodiments, step 510 comprises separating unitary part 202 from unitary support structure 206. In some embodiments, unitary part 202 a separated from unitary support structure 206 by applying a force to unitary support structure 206. In some embodiments, the force applied to unitary support structure 206 causes unitary breakaway-features 204 to break, thereby separating unitary part 202 and unitary support structure 206. In some embodiments, step 510 comprises separating additional support structures from unitary part 202. In some embodiments, step 510 may not be performed and unitary support structure 206 may remain attached to unitary part 202.

In some embodiments, method 500 comprises additional steps. In some embodiments, method 500 comprises curing the resin-ceramic slurry used to additively manufacture first ceramic green body 102 and second ceramic green body 110. In some embodiments, curing the resin-ceramic slurry is done using UV-light, chemical curing, heat curing, or any other such curing process.

Figure 6:
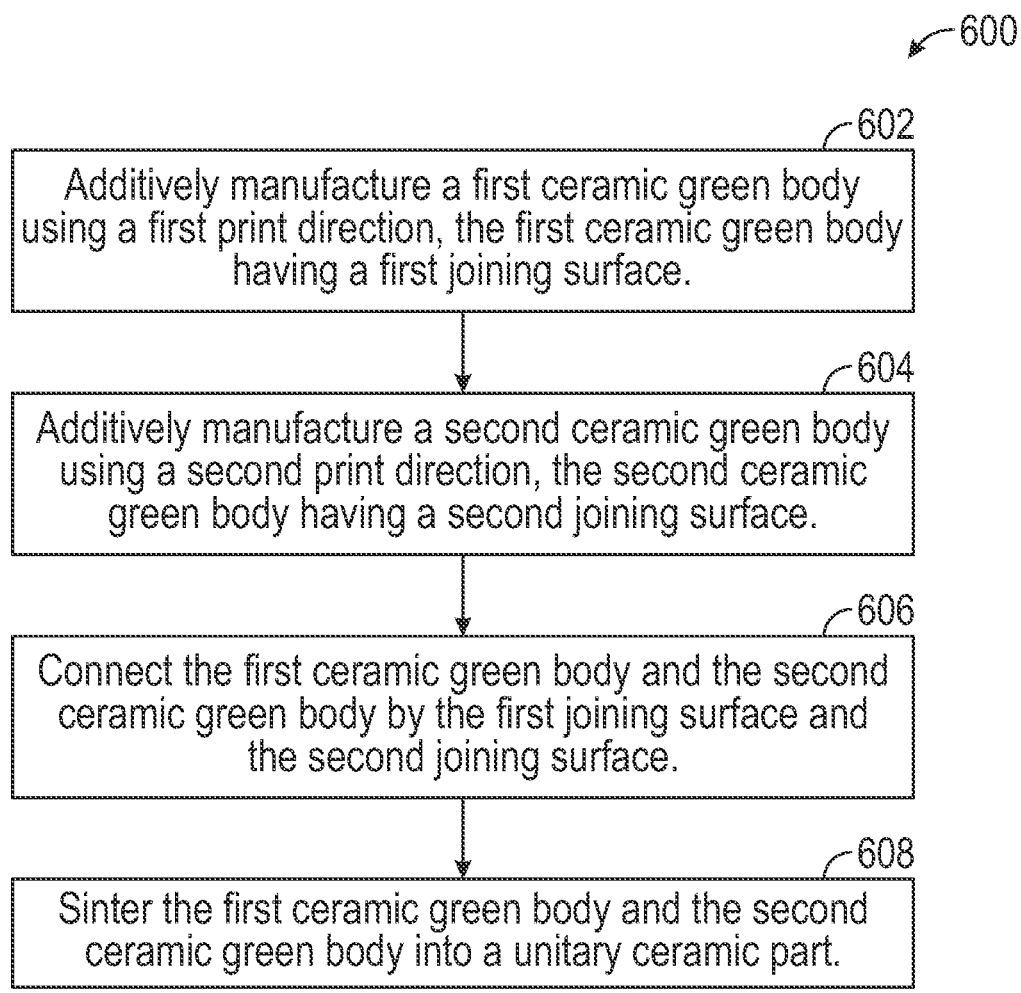
FIG. 6 illustrates a method for combining ceramic green bodies having particular print directions to form a unitary ceramic part for some embodiments.

FIG. 6 illustrates an embodiment of a method of additively manufacturing unitary ceramic parts such as method 600. In some embodiments, method 600 may be conducted via machinery. In some embodiments, method 600 may be performed by robotics such as robotic assembly lines, robotic manufacturing arms, or any other such robotic device. In some embodiments, method 600 begins with step 602.

In some embodiments, step 602 comprises additively manufacturing first ceramic green body 102. The first ceramic part may include first support structure 106 additively manufactured in conjunction with manufacturing first ceramic green body 102. In some embodiments, first ceramic green body 102 and first support structure 106 may be integrated together such that first support structure 106 is integrated into first ceramic green body 102. In some embodiments, first support structure 106 is configured to prevent flexion of first ceramic green body 102 during sintering. For example, first support structure 106 may extend between first edge 122a of the ceramic part to second edge 122b of first ceramic green body 102 part such that first support structure 106 provides a resistance to flexion forces causing the first side to shrink towards the second side.

In some embodiments, method 600 continues with step 604. Step 604 may be directed to additively manufacturing Second ceramic green body 110. Second ceramic green body 110 may include second support structure 114 additively manufactured in conjunction with second ceramic green body 110. In some embodiments, second ceramic green body 110 and second support structure 114 may be integrated together such that second support structure 114 may be integrated into second ceramic green body 110. In some embodiments, second support structure 114 may be configured to prevent flexion of second ceramic green body 110 during sintering. For example, second support structure 114 may be configured to extend between first side 124a of second ceramic green body 110 to second side 124b of second ceramic green body 110 such that second support structure 114 provides a resistance to flexion forces causing first side 124a to shrink towards second side 124b.

In some embodiments, method 600 comprises step 606. Step 606 may be directed to positioning first ceramic green body 102 and second ceramic green body 110 such that first joint surface 104 and second joint surface 112 are connected. In some embodiments, first joint surface 104 and second joint surface 112 may comprise matching features configured to be connected such that first joint surface 104 and second joint surface 112 are combined by sintering. In some embodiments, first joint surface 104 and second joint surface 112 may be connected by applying a slurry mixture to first joint surface 104 and second joint surface 112 then interfacing the joining surfaces such that the slurry mixture serves as an adhesive material that may be sintered into the structure of unitary part 202.

In some embodiments, method 600 comprises step 608. Step 608 may comprise sintering first ceramic green body 102 and second ceramic green body 110 such that first ceramic green body 102 and second ceramic green body 110 combine forming unitary part 202. In some embodiments, unitary part 202 may have all the features of first ceramic green body 102 and second ceramic green body 110. In some embodiments, some of the features of first ceramic green body 102 and second ceramic green body 110 are lost during sintering. For example, first ceramic green body 102 and second ceramic green body 110 may comprise joining surfaces that, when first ceramic green body 102 and second ceramic green body 110 are combined and sintered, become indistinguishable from the surface of the unitary part 202 and are permanently joined together thereby removing their ability to further join surfaces. In some embodiments, unitary part 202 may be structurally supported by the structure of the first and second joining surfaces. For example, first ceramic green body 102 having the first joining surface may be formed with a first print direction and second ceramic green body 110 having the second joining surface may be formed with a second print direction. First joint surface 104 and second joint surface 112 may be interfaced providing a cross-hatched structure of the print directions thereby providing a greater resistance to forces in either direction.

In some embodiments, first ceramic green body 102 and second ceramic green body 110 may comprise first joint surface 104 and second joint surface 112 respectively. In some embodiments, first joint surface 104 and second joint surface 112 may be configured to interface with each other. For example, first joint surface 104 may comprise an interlocking sawtooth pattern matching a corresponding interlocking sawtooth pattern of second joint surface 112 such that first ceramic green body 102 and second ceramic green body 110 may be joined by first joint surface 104 and second joint surface 112. In some embodiments, first support structure 106 and first support joint surface second support structure 114 may comprise first support joint surface 108 and second support joint surface 116. In some embodiments first support joint surface 108 and second support joint surface 116 may be configured to interface with each other. For example, first support joint surface 108 may comprise a set of square teeth matching a corresponding set of square teeth present on second support joint surface 116 such that first support joint surface 108 and second support joint surface 116 may be joined together.

In some embodiments, first support structure 106 and the second support structure may comprise materials different from the ceramics used for first ceramic green body 102 and second ceramic green body 110. In some embodiments, first ceramic green body 102 may comprise a resin-ceramic slurry mixture. In some embodiments, the resin-ceramic slurry mixture is configured to shrink based upon the ratio of resin to ceramic. For example, the resin-ceramic slurry may comprise 50% resin and 50% ceramic such that the resin-ceramic slurry has an expected shrink factor of 50%. i.e., the overall size of the part is expected to shrink by 50%. In some embodiments, the resin-ceramic slurry may have an expected shrink factor of 15% based upon a 15% resin, 85% ceramic mixture. In some embodiments, the resin is removed from first ceramic green body 102 by the sintering process.

In some embodiments, first support structure 106 and second support structure 114 may comprise resin-ceramic slurry having a different resin to slurry ratio than first ceramic green body 102 and second ceramic green body 110. In some embodiments, the resin-ceramic slurry of first support structure 106 and second support structure 114 may be configured to have a lower shrink factor (i.e., ratio of resin to ceramic) than the resin-ceramic slurry used in first ceramic green body 102 and second ceramic green body 110. First support structure 106 and second support structure 114 may shrink less than first ceramic green body 102 and second ceramic green body 110 thereby forming unitary support structure 206 during sintering. In some embodiments, first support structure 106 and second support structure 114 may be configured to shrink more than first ceramic green body 102 and second ceramic green body 110. For example, first support structure 106 and second support structure 114 may have a resin-ceramic slurry with a shrink factor of 30% while first ceramic green body 102 and second ceramic green body 110 may have a shrink factor of 50%.

In some embodiments, first support structure 106 may be configured to interface with second support structure 114 such that first support structure 106 and second support structure 114 form a unitary support structure. For example, in some embodiments, first support structure 106 may have a set of square teeth configured to interface with a corresponding set of square teeth present on second support structure 114. In some embodiments, the first joint surface of first ceramic green body 102 and the second joint surface of second ceramic green body 110 may be interfaced in conjunction with the first support joint surface and the second support joint surface.

In some embodiments, first ceramic green body 102 and second ceramic green body 110 may be sintered with first support structure 106 and second support structure 114. In some embodiments, first support structure 106 and second support structure 114 may be configured to provide structural support during sintering. For example, first support structure 106 and second support structure 114 may be configured to brace a first side of first ceramic green body 102 and second ceramic green body 110 against flexion forces of a second opposite side of first ceramic green body 102 and second ceramic green body 110. In some embodiments, first support structure 106 and second support structure 114 are unified to form a unitary support structure. In some embodiments, the unitary support structure may provide structural support to the unitary ceramic part during sintering.

In some embodiments, first support structure 106 and second support structure 114 may comprise first separable features 130 and second separable features 132 configured to allow first support structure 106 and second support structure 114 to be separated from the unitary ceramic part after sintering. In some embodiments, first support structure 106 and second support structure 114 combine to form a unitary support structure. In some embodiments, first separable features 130 of first support structure 106 and second separable features 132 of second support structure 114 are integrated into the unitary support structure. In some embodiments, first separable features 130 and second separable features 132 integrated into the unitary support structure may allow unitary support structure 206 to be separated from unitary part 202. In some embodiments, first separable features 130 and second separable features 132 may comprise a central breaking line configured to allow first support structure 106 and second support structure 114 to be broken along the central breaking line such that first support structure 106 and second support structure 114 may be separated from first ceramic green body 102 and second ceramic green body 110 without damage. For example, first support structure 106 and second support structure 114 may have a low percentage contact area between the support structure and first ceramic green body 102 and second ceramic green body 110. The first and second support structure may only contact 5-25%, 5-20%, 5-15%, or 5-10% of the surface of first ceramic green body 102 and second ceramic green body 110 such that breaking the joint between the support structures and the ceramic parts may be unlikely to damage first support structure 106 and second support structure 114.

Figure 7:
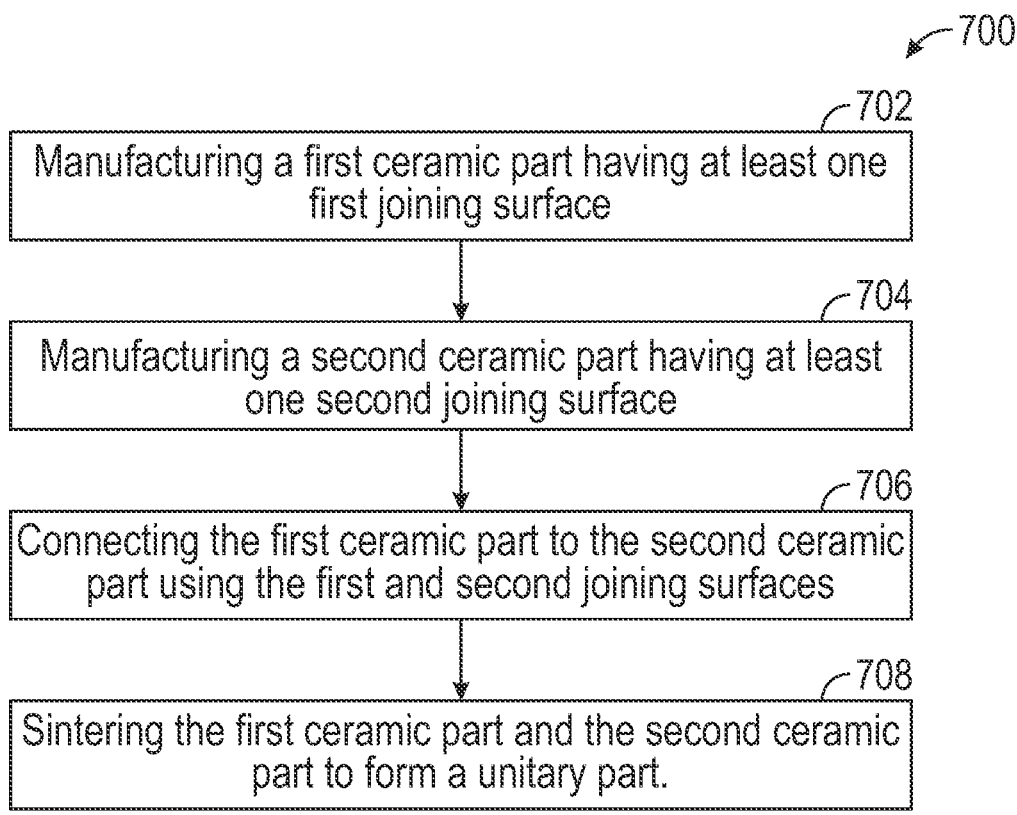
FIG. 7 illustrates a method for combining ceramic green bodies to form a unitary ceramic part for some embodiments.

FIG. 7 illustrates a method for additively manufacturing a unitary ceramic part for some embodiments. In some embodiments, the method of FIG. 7 may be exemplified by method 700. In some embodiments, method 700 may be performed by industrial machinery. In some embodiments, method 700 may be performed by industrial robotics.

In some embodiments, method 700 comprises step 702. Step 702 may comprise manufacturing a first ceramic part. In some embodiments, step 702 may comprise manufacturing first ceramic green body 102. In some embodiments, step 702 may comprise manufacturing first ceramic green body 102 with first support structure 106 absent. In some embodiments, step 702 comprises manufacturing first ceramic green body 102 with first support structure 106 and first support joint surface 108 absent. In some embodiments, step 702 comprises manufacturing a ceramic part similar to first ceramic green body 102 but comprising a different shape. In some embodiments, step 702 comprises manufacturing any ceramic green body regardless of shape.

In some embodiments, method 700 comprises step 704. In some embodiments, step 704 may comprise manufacturing a second ceramic part. In some embodiments, step 704 may comprise manufacturing second ceramic green body 110. In some embodiments, step 704 may comprise manufacturing second ceramic green body 110 with second joint surface 112. In some embodiments, step 704 may comprise manufacturing second ceramic green body 110 as described above. In some embodiments, step 704 may comprise manufacturing second ceramic green body 110 with second joint surface 112, second support structure 114, and/or second support joint surface 116, or any combination thereof absent. In some embodiments, step 704 comprises manufacturing second ceramic green body 110 with additional features not shown. In some embodiments, step 704 comprises manufacturing second ceramic green body 110 using stereolithography, fused deposition modeling, or any other such additive manufacturing technique. In some embodiments, step 704 comprises manufacturing second ceramic green body 110 used traditional manufacturing such as clay forming, sculpting, or heat pressing.

In some embodiments, method 700 comprises step 706. In some embodiments, step 706 comprises connecting first ceramic green body 102 and second ceramic green body 110 together using first joint surface 104 and second joint surface 112. In some embodiments, connecting first ceramic green body 102 and second ceramic green body 110 comprises positioning first ceramic green body 102 and second ceramic green body 110 such that first joint surface 104 interfaces with second joint surface 112. In some embodiments, step 706 comprises positioning first ceramic green body 102 and second ceramic green body 110 such that first ceramic green body 102 contacts second ceramic green body 110.

In some embodiments, step 706 comprises applying a layer of the resin-ceramic slurry between first ceramic green body 102 and second ceramic green body 110 before connecting. In some embodiments, applying the later of resin-ceramic slurry may provide a layer of sinterable adhesive that hardens into the same material as first ceramic green body 102 and second ceramic green body 110 when sintered.

In some embodiments, method 700 comprises step 708. In some embodiments, step 708 comprises sintering first ceramic green body 102 and second ceramic green body 110. In some embodiments, step 708 comprises sintering first ceramic green body 102 and first support joint surface 108 with an uncured layer of resin-ceramic slurry between first joint surface 104 and second joint surface 112. In some embodiments, step 708 comprises selectively sintering portions of first ceramic green body 102 and second ceramic green body 110. For example, first joint surface 104 and second joint surface 112 may be selectively sintered using a sintering technique such as selective laser sintering to join first ceramic green body 102 and second ceramic green body 110. Then the rest of first ceramic green body 102 and second ceramic green body 110 may be sintered using traditional methods.

Figure 8:
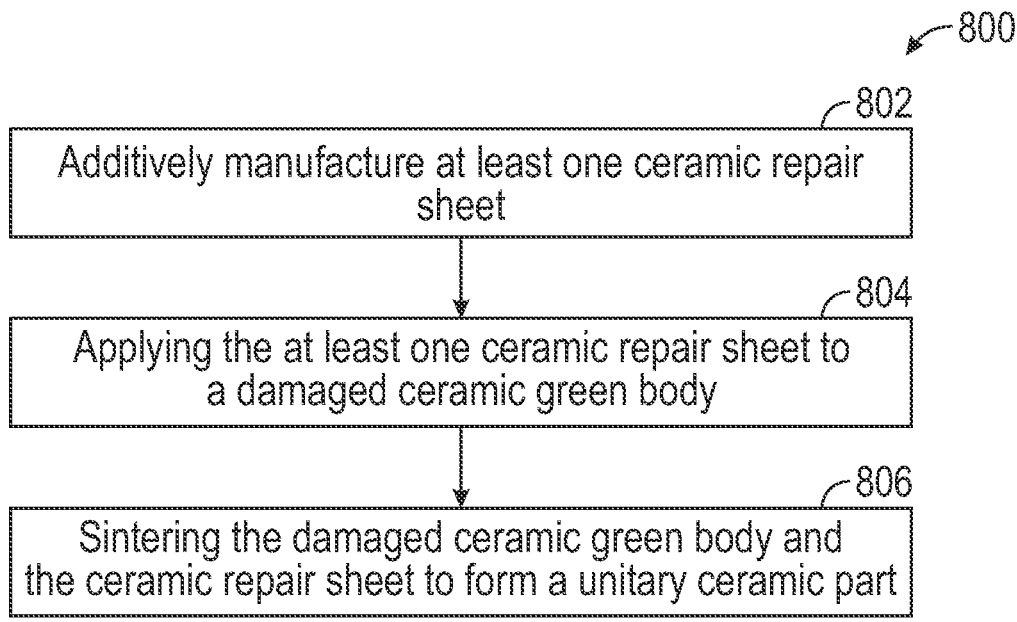
FIG. 8 illustrates a method for repairing ceramic green bodies with ceramic sheets for some embodiments.

FIG. 8 illustrates a method for repairing a damaged ceramic green body for some embodiments. In some embodiments, first ceramic green body 102 may comprise manufacturing defects causing first ceramic green body 102 to be damaged. In some embodiments, first ceramic green body 102 may have poor printing quality. In some embodiments, the damaged part may have missing layers, bed separation, or any other form of print defect found in additive manufacturing.

In some embodiments, method 800 begins with step 802. Step 802 may comprise additively manufacturing ceramic sheet 406 as described above. Ceramic sheet 406 may comprise a thin sheet of resin-ceramic slurry. For example, ceramic sheet 406 may comprise a resin-ceramic sheet 5-10 millimeters thick. It is noted that ceramic sheet 406 may comprise any thickness without departing from the scope of the present disclosure. In some embodiments, ceramic sheet 406 may comprise only few thin layers of resin-ceramic slurry. In some embodiments, ceramic sheet 406 may be configured to have a resin to ceramic ratio less than the additively manufactured part.

In some embodiments, method 800 comprises step 804. Step 804 may comprise applying ceramic sheet 406 to first ceramic green body 102. In some embodiments, ceramic sheet 406 may be a plurality of ceramic repair sheets which may be applied to first ceramic green body 102. In some embodiments, ceramic sheet 406 is additively manufactured according to a print direction. In some embodiments, ceramic sheet 406 may be applied to first ceramic green body 102 such that first ceramic green body's 102 print direction may be perpendicular to the print direction of ceramic sheet 406.

In some embodiments, a thin layer of uncured resin-ceramic slurry may be applied to ceramic sheet 406 and first ceramic green body 102 to improve adhesion between ceramic sheet 406 and first ceramic green body 102. In some embodiments, ceramic sheet 406 may be applied to first ceramic green body 102. In some embodiments, a plurality of additional ceramic sheets may be applied to increase rigidity, provide additional repair, or provide a different appearance. In some embodiments, the surface of ceramic sheet 406 is different than the surface of first ceramic green body 102. In some embodiments, ceramic sheet 406 may be applied to first ceramic green body 102 to change the surface texture of first ceramic green body 102. In some embodiments, ceramic sheet 406 may be applied to an un-damaged ceramic part. In some embodiments, the un-damaged ceramic part may be covered in the plurality of ceramic sheets such that the entire surface of the un-damaged ceramic part may be changed. In some embodiments, the surface of ceramic sheet 406 may comprise a smooth surface. In some embodiments, the surface of ceramic sheet 406 may comprise a rough surface, a textured surface, a patterned surface, a ridged surface, or any other such surface finish.

In some embodiments, ceramic sheet 406 is malleable and bendable. In some embodiments, ceramic sheet 406 may conform around the contours of first ceramic green body 102. In some embodiments, ceramic sheet 406 may be additively manufactured to have a shape matching the contours of first ceramic green body 102. In some embodiments, ceramic sheet 406 may be applied to first ceramic green body 102 using a robotic appendage. In some embodiments, the first ceramic sheet may be vacuum formed to the contours of first ceramic green body 102.

In some embodiments, method 800 comprises step 806. In some embodiments, step 806 comprises sintering first ceramic green body 102 and first ceramic green body 102 to form unitary part 202. In some embodiments, the plurality of ceramic sheets may be sintered with first ceramic green body 102 to form unitary part 202. In some embodiments, first ceramic green body 102 may be partially sintered when ceramic sheet 406 is applied. In some embodiments, ceramic sheet 406 is applied before sintering. In some embodiments, ceramic sheet 406 may be applied during sintering. In some embodiments, the plurality of ceramic sheets may be applied prior to sintering. In some embodiments, the plurality of ceramic sheets may be applied after sintering and then first ceramic green body 102 may be re-sintered. In some embodiments, the plurality of sheets may be applied to first ceramic green body 102 during sintering.

In some embodiments, ceramic sheet 406 may be configured to provide additional structural rigidity to the damaged part. For example, ceramic sheet 406 may have a print direction opposing the print direction of the damaged part. The difference in print directions may (e.g., cross hatching) may provide structural rigidity. In some embodiments, ceramic sheet 406 may provide structural rigidity simply by increasing the thickness of the structure. In some embodiments, ceramic sheet 406 may restore the thickness of weakened sections of the ceramic body to their original thickness such that structural rigidity is not lost. In some embodiments, ceramic sheet 406 may be used to seal holes in the surface of first ceramic green body 102. For example, first ceramic green body 102 may be manufactured with missing sections. Ceramic sheet 406 may be arranged to cover or seal the missing sections such that first ceramic green body 102 may still be used for its intended purpose. In some embodiments, a layer of the resin-ceramic slurry may be applied before applying ceramic sheet 406 sheets to both provide adhesive action and provide seal around the missing sections of first ceramic green body 102. In some embodiments, ceramic sheet 406 comprises a plurality of ceramic sheets.

In some embodiments, ceramic sheet 406 is applied to the damaged part before the part is sintered to a second ceramic part. For example, first ceramic green body 102 may be a first part. Ceramic sheet 406 may be applied to first ceramic green body 102 preparing first ceramic green body 102 for being combined into unitary part 202. First ceramic green body 102 may be damaged and may be positioned such that first joint surface 104 interfaces with second joint surface 112 of second ceramic green body 110. First ceramic green body 102, ceramic sheet 406, and second ceramic green body 110 may then be sintered to form a unitary part 202.

In some embodiments, second ceramic green body 110 may also be a damaged ceramic part. In some embodiments, ceramic sheet 406 is applied to second ceramic green body 110 to repair defects or damage to the part. For example, as described above, ceramic sheet 406 may be applied to first ceramic green body 102 to cover or seal missing sections of first ceramic green body 102. In some embodiments, a layer of resin-ceramic slurry is applied to second ceramic green body 110 before applying ceramic sheet 406 such that the slurry mixture may serve as an adhesive agent and a seal around the missing sections of second ceramic green body 110.

In some embodiments, first ceramic green body 102 and the second ceramic damaged part may then be sintered to form a unitary ceramic part. In some embodiments, first ceramic green body 102 and second ceramic green body 110 may be repaired by applying ceramic sheet 406 to the first and second damaged ceramic part prior to sintering. In some embodiments, the first and second damaged ceramic part may comprise joining surfaces that may be interfaced prior to sintering. In some embodiments, ceramic sheet 406 may be applied to the first and second damaged ceramic part such that the joining surfaces, while interfaced, are covered by ceramic sheet 406 thereby improving the connection between first ceramic green body 102 and second ceramic green body 110.

System for Combining Additively Manufactured Ceramic Parts

Figure 9:
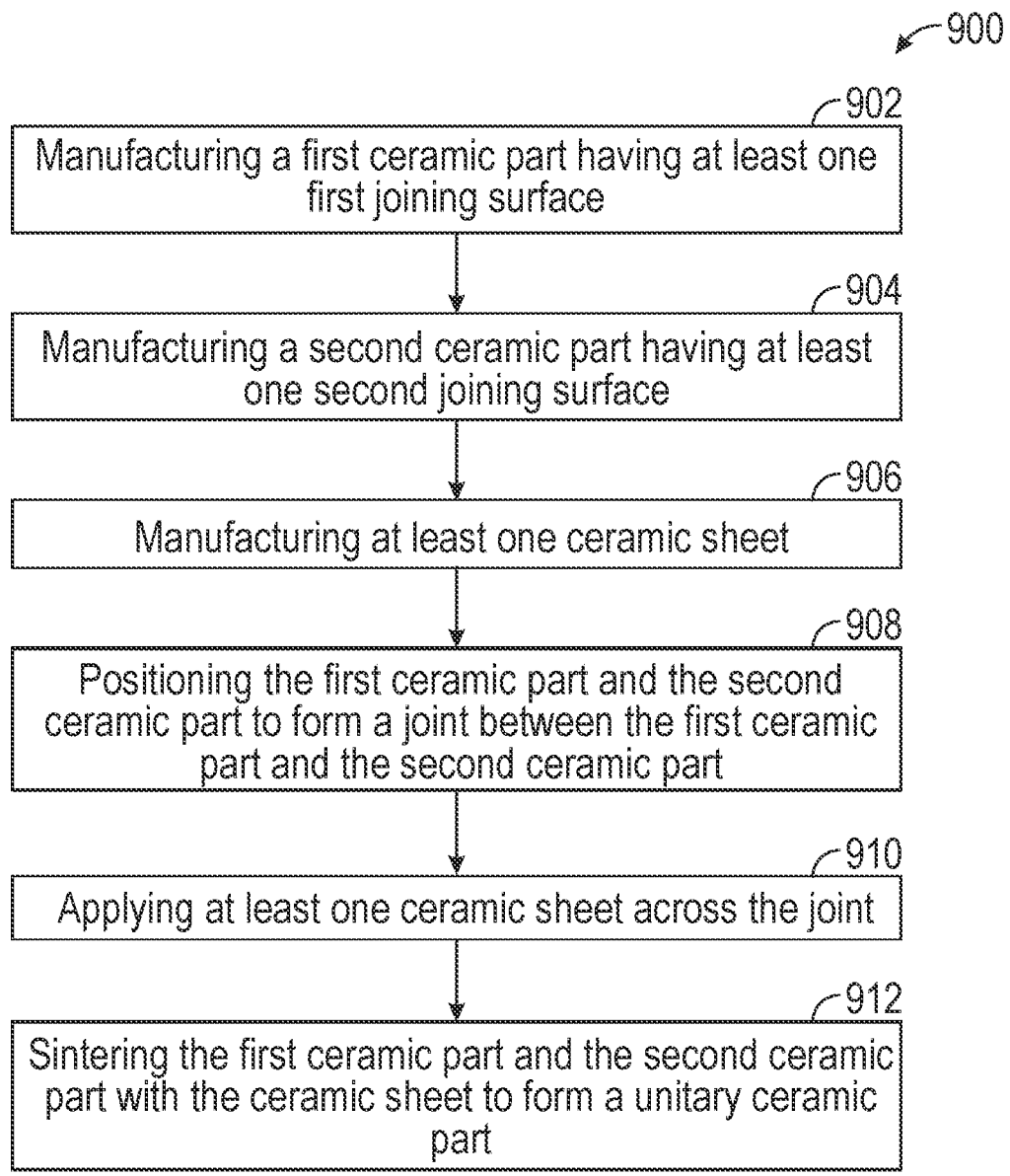
FIG. 9 illustrates a method for combining ceramic green bodies with ceramic sheets for some embodiments.

FIG. 9 illustrates method 900 for additively manufacturing a unitary ceramic part for some embodiments. In some embodiments, method 900 is directed to additively manufacturing a ceramic part larger than the available print volume. For example, method 900 may be employed to additively manufacture a cylinder having a radius of 5 in and a height of 10 inches on a print bed having a 5×5×5 inch print volume (i.e., 125 cubic-inch print volume). In some embodiments, method 900 may be directed to increasing the size of a first ceramic part (such as first ceramic green body 102 as described above) by joining the first ceramic part to a second ceramic part (such as second ceramic green body 110 as described above).

In some embodiments, method 900 begins with step 902. Step 902 may comprise manufacturing first ceramic green body 102. In some embodiments, step 902 comprises additively manufacturing first ceramic green body 102 with first joint surface 104. In some embodiments, step 902 comprises manufacturing first ceramic green body 102 with first support structure 106. In some embodiments, step 902 comprises additively manufacturing first ceramic green body 102 with first support structure 106 and first support joint surface 108. In some embodiments, step 902 comprises manufacturing first ceramic green body 102 with first joint surface 104 and a plurality of other joint surfaces integrated into first ceramic green body 102.

In some embodiments, method 900 comprises step 904. In some embodiments, step 904 comprises additively manufacturing second ceramic green body 110. In some embodiments, step 904 comprises additively manufacturing second ceramic green body 110 wherein second ceramic green body 110 comprises second joint surface 112, second support structure 114, second support joint surface 116, or any combination thereof. In some embodiments, step 904 may be substantially similar to step 902 wherein first ceramic green body 102 may be replaced by second ceramic green body 110.

In some embodiments, method 900 comprises step 906. In some embodiments, step 906 comprises additively manufacturing a ceramic sheet. In some embodiments, the ceramic sheet may be substantially similar to ceramic sheet 406 as described above. In some embodiments, step 906 may comprise additively manufacturing a plurality of ceramic sheets substantially similar to ceramic sheet 406. In some embodiments, step 906 may comprise additively manufacturing ceramic sheet 406 using stereolithography, fused deposition modeling, selective laser sintering, or any other such additive manufacturing technique.

In some embodiments, method 900 comprises step 908. In some embodiments, step 908 comprises positioning first ceramic green body 102 and second ceramic green body 110 to form a joint between first ceramic green body 102 and second ceramic green body 110. In some embodiments, the joint is formed by first joint surface 104 interfacing with second joint surface 112. In some embodiments, first joint surface 104 and second joint surface 112 are absent and the joint may be formed by abutting first ceramic green body 102 and second ceramic green body 110. In some embodiments, a layer of the resin-ceramic slurry is applied between first ceramic green body 102 and second ceramic green body 110 to act as an adhesive during sintering. In some embodiments, the resin-ceramic slurry between first ceramic green body 102 and second ceramic green body 110 is sintered to form a connection between first ceramic green body 102 and second ceramic green body 110.

In some embodiments, method 900 comprises step 910. In some embodiments, step 910 comprises applying at least one ceramic sheet 406 across the joint between first ceramic green body 102 and second ceramic green body 110. In some embodiments, a plurality of ceramic sheets 406 may be applied across the joint formed by first ceramic green body 102 and second ceramic green body 110. In some embodiments, a layer of ceramic-slurry may be applied to first ceramic green body 102 and second ceramic green body 110 before ceramic sheet 406 is applied. In some embodiments, an uncured layer of resin-ceramic slurry may be applied to ceramic sheet 406 before ceramic sheet 406 is applied to first ceramic green body 102 and second ceramic green body 110. In some embodiments, first ceramic green body 102 and second ceramic green body 110 may not abut and ceramic sheet 406 may be applied across a gap between first ceramic green body 102 and second ceramic green body 110.

In some embodiments, method 900 comprises step 912. In some embodiments, step 912 comprises sintering first ceramic green body 102, second ceramic green body 110, and ceramic sheet 406 to form unitary part 202. In some embodiments, step 912 comprises sintering only the connection between first ceramic green body 102 and second ceramic green body 110. For example, first ceramic green body 102 and second ceramic green body 110 may be joined by ceramic sheet 406. A selective laser sintering process may sinter only ceramic sheet 406 and the portions of first ceramic green body 102 and second ceramic green body 110 covered by ceramic sheet 406. Thus, first ceramic green body 102 and second ceramic green body 110 may be connected using selective laser sintering.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for producing a unitary part, the method comprising:
    additively manufacturing a first ceramic part comprising a first joint surface and a first support structure, wherein the first joint surface comprises a first lipped edge integrated within a first body of the first ceramic part, the first lipped edge comprising a different circumference than a first outer surface of the first body of the first ceramic part;
    additively manufacturing a second ceramic part comprising a second joint surface and a second support structure, wherein the second joint surface comprises a second lipped edge integrated within a second body of the second ceramic part, the second lipped edge comprising a similar circumference as a second outer surface of the second body of the second ceramic part;
    positioning the first ceramic part and the second ceramic part such that the first joint surface contacts the second joint surface by overlapping the first lipped edge with the second lipped edge such that a continuous external surface is created between the first ceramic part and the second ceramic part and such that the first support structure contacts the second support structure;
    sintering the first joint surface to the second joint surface such that the first lipped edge overlapping the second lipped edge are combined and such that the first support structure is combined to the second support structure to form the unitary part comprising the first ceramic part and the second ceramic part; and
    separating the first support structure and the second support structure from the unitary part.

2. The method of claim 1, wherein the first joint surface and the second joint surface are configured to be pressure fit during sintering, wherein the second joint surface shrinks around the first joint surface during sintering.

3. The method of claim 1, further comprising manufacturing a third support structure configured to support the first ceramic part and a fourth support structure configured to support the second ceramic part.

4. The method of claim 3, wherein the first support structure and the second support structure comprise a ceramic material.

5. The method of claim 1, wherein the first ceramic part is additively manufactured using a first print direction, wherein the second ceramic part is additively manufactured using a second print direction that is distinct from the first print direction, wherein the first print direction causes the first ceramic part to shrink along a first dimension during sintering, wherein the second print direction causes the second ceramic part to shrink along a second dimension during sintering.

6. The method of claim 1, further comprising applying an additively manufactured ceramic sheet across a joint between the first ceramic part and the second ceramic part, wherein the additively manufactured ceramic sheet is formed with a first external surface of the first ceramic part and a second external surface of the second ceramic part to prevent separation of the first ceramic part and the second ceramic part.

7. The method of claim 1, wherein the first ceramic part further comprises a first support joint surface, wherein the second ceramic part further comprises a second support joint surface, wherein the second support joint surface is connected to the first support joint surface while sintering the first joint surface to the second joint surface.

8. A method for producing a unitary part comprising a first additively manufactured ceramic part comprising: at least one first joint surface, wherein the at least one first joint surface comprises a first lipped edge integrated within a first body of the first additively manufactured ceramic part, the first lipped edge comprising a different circumference than a first outer surface of the first body of the first additively manufactured ceramic part; a first support structure; and at least one first support joint surface; and a second additively manufactured ceramic part comprising: at least one second joint surface connected to the at least one first joint surface of the first additively manufactured ceramic part, wherein the at least one second joint surface comprises a second lipped edge integrated within a second body of the second additively manufactured ceramic part, the second lipped edge comprising a similar circumference as a second outer surface of the second body of the second additively manufactured ceramic part; a second support structure; and a second support joint surface connected to the at least one first support joint surface, the method comprising:
- additively manufacturing the first additively manufactured ceramic part;
- additively manufacturing the second additively manufactured ceramic part;
- positioning the first additively manufactured ceramic part and the second additively manufactured ceramic part such that the first lipped edge contacts the second lipped edge by overlapping the first lipped edge of the at least one first joint surface with the second lipped edge of the at least one second joint surface such that a continuous external surface is created between the first additively manufactured ceramic part and the second additively manufactured ceramic part and such that the first support structure contacts the second support structure;
- sintering the at least one first joint surface to the at least one second joint surface such that the first lipped edge overlapping the second lipped edge are combined and such that the first support structure is combined to the second support structure to form the unitary part comprising the first additively manufactured ceramic part and the second additively manufactured ceramic part; and separating the first support structure and the second support structure from the unitary part.

9. The method of claim 8,
- wherein the second additively manufactured ceramic part comprises a third joint surface, and
- wherein the second additively manufactured ceramic part comprises a third support joint surface.

10. The method of claim 9, further comprising: additively manufacturing a third additively manufactured ceramic part comprising:
- a fourth joint surface connected to the third joint surface of the second additively manufactured ceramic part;
- a third support structure; and
- a fourth support joint surface connected to the third support joint surface of the second additively manufactured ceramic part.

11. The method of claim 10, wherein the first support structure, the second support structure, and the third support structure are configured to prevent flexion of the first additively manufactured ceramic part, the second additively manufactured ceramic part, and the third additively manufactured ceramic part during sintering.

12. The method of claim 8, wherein the first additively manufactured ceramic part is configured to shrink in a first direction and the second additively manufactured ceramic part is configured to shrink a second direction distinct from the first direction.

13. The method of claim 8, further comprising applying an additively manufactured ceramic sheet to the first additively manufactured ceramic part.

\* \* \* \* \*